July 12, 1966
L. E. DAUM ETAL
3,260,983
WATERPROOF ELECTRICAL JUNCTIONS
Filed Jan. 14, 1963
3 Sheets-Sheet 1
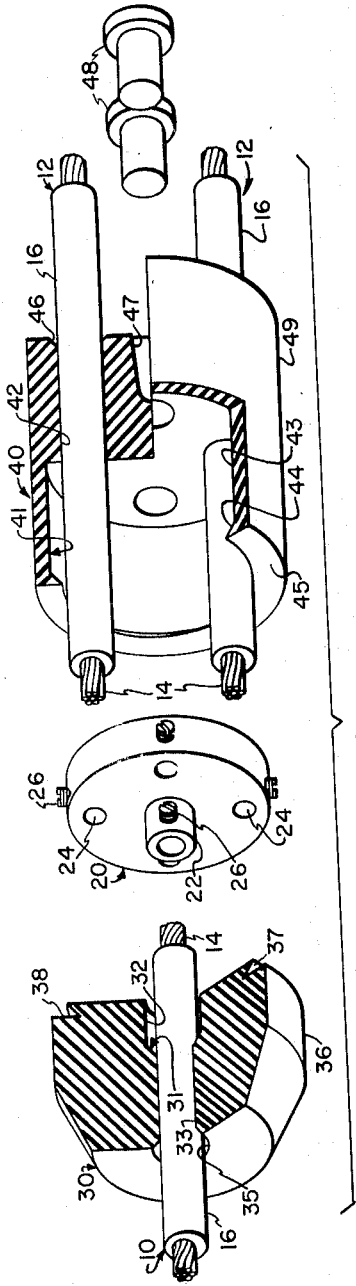
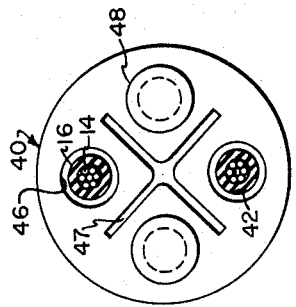
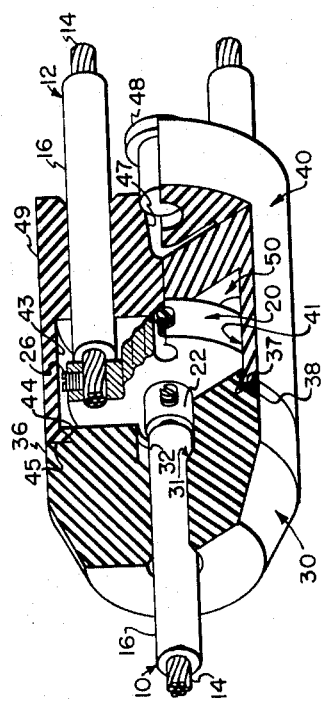
INVENTORS
LEONARD E. DAUM
RUDOLPH P. ALDIGHIERI
BY *Arthur Jacob*
ATTORNEY July 12, 1966  L. E. DAUM ETAL  3,260,983
WATERPROOF ELECTRICAL JUNCTIONS
Filed Jan. 14, 1963  3 Sheets-Sheet 2

INVENTORS
LEONARD E. DAUM
RUDOLPH P. ALDIGHIERI
BY *Arthur Jacob*
ATTORNEY

July 12, 1966 L. E. DAUM ETAL 3,260,983
WATERPROOF ELECTRICAL JUNCTIONS
Filed Jan. 14, 1963 3 Sheets-Sheet 3

INVENTORS
LEONARD E. DAUM
RUDOLPH P. ALDIGHIERI
BY *Arthur Jacob*
ATTORNEY

United States Patent Office 3,260,983
Patented July 12, 1966

3,260,983
WATERPROOF ELECTRICAL JUNCTIONS
Leonard E. Daum, Morristown, and Rudolph P. Aldighieri, Long Valley, N.J., assignors to Elastic Stop Nut Corporation of America, Union, N.J., a corporation of New Jersey
Filed Jan. 14, 1963, Ser. No. 251,426
7 Claims. (Cl. 339—60)

The present invention relates generally to electrical functions and pertains more specifically to those electrical connectors which are known as line connectors or Y connectors and which are utilized in completing an electrical circuit junction between a plurality of first conductors and at least one second conductor.

Where the use of electrical cables requires that the cables be exposed to adverse elements by being placed upon the surface of the ground, directly buried in the ground or immersed in water, difficulties have been experienced in providing electrical junctions among several such cables, which junctions, or line connections, may readily be fabricated in the field and may be used with safety in such installations. Line connectors which have components integrally molded to connecting cables have been proposed and provide the necessary degree of resistance to water and other elements which will have an adverse effect upon electrical cable connections, but these connectors have the disadvantage of not being readily fabricated in the field and are limited to factory installation, thus requiring that the length of cable leading to such connectors be specified at the factory. Because it is often difficult to specify such lengths with a practical degree of accuracy, it would be highly desirable to have available a line connector which may readily be assembled to provide a cable junction in the field and which will exhibit the necessary resistance to adverse elements while providing a strong mechanical connection as well as a good electrical connection.

It is therefore an important object of the invention to provide a line connector which may conveniently be applied in the field to establish a junction among several cables, the use of which connector will result in an efficient electrical junction as well as a positive mechanical connection among the cables, affording safety in installations on the surface of the ground, directly buried in the ground or immersed in water.

Another object of the invention is to provide an assembled line connector for several cables wherein readily assembled and disassembled mechanical and electrical connections are formed between conductors of the cables and are protectively encased within a waterproof chamber formed by assembled members which are capable of being disassembled independent of the conductor connections so that the chamber may be opened to expose the connections therein for periodic inspection without disturbing the connections and the connections may still be disconnected when desired.

A further object of the invention is to provide a readily assembled waterproof line connector wherein an electrical junction established among the conductors of several cables is protectively encased within a chamber formed by assembled members, and tensile forces which may be applied to the cables are transmitted directly to a positive mechanical connection between the conductors independent of the encasing members so that such forces will not tend to open the sealed chamber and inadvertently exposed the juncton, yet the connections may still be disconnected when desired.

The invention may be described briefly as an electrical connector assembly for providing a detachable, waterproof, insulated electrical junction between a plurality of first cables and at least one second cable, each cable having an electrical conductor and a jacket of insulating material, the connector assembly comprising a first member of resilient insulating material having a plurality of independent portions gripping the cable jackets of the plurality of first cables such that the first member is movable along the first cables relative to the cable jackets thereof and is in watertight relation therewith and a second member of resilient insulating material having at least one portion gripping the cable jacket of the second cable such that the second member is movable along the second cable relative to the cable jacket thereof and is in watertight relation therewith. Means are provided detachably securing and electrically connecting the conductors to one another independent of the position of the first and second members along the cables and mechanically securing the cables to one another against detachment during relative movement of the first and second members. The members each have further portions separably gripping one another in detachable watertight relation to form a waterproof chamber within which chamber the above means are encased to protectively seal the electrical connections established among the conductors, the further portions being disengagable from one another by movement of the first and second members relative to one another and relative to the cables to thereby open the chamber and expose the connections without disconnecting the connections.

The novel features of the invention, as well as additional objects and advantages thereof, will be more fully understood from the following description of preferred embodiments thereof, when read in conjunction with the accompanying drawings in which:

FIGURE 1 is an exploded perspective view of an electrical connector constructed in accordance with the invention;

FIGURE 2 is a partially sectioned perspective view of an assembled connection employing the connector of FIGURE 1;

FIGURE 3 is an end elevational view of the assembly of FIGURE 2;

Figure 7:
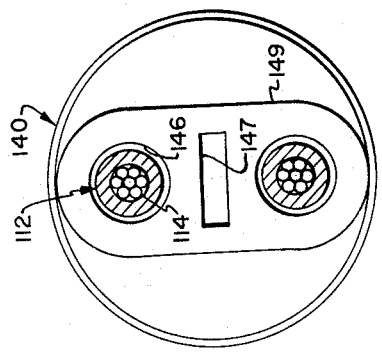
FIGURE 7 is an end elevational view of the right-hand end of the assembly of FIGURE 6.

In FIGURE 1 the component parts of an electrical connector are shown prior to their assembly at the terminus of cables 10 and 12 where a junction will be formed, each cable being comprised of an electrical conductor 14, which may be solid or stranded, and a covering, or jacket 16 of insulating material. In order to establish a strong mechanical connection together with an efficient electrical junction between the conductors of cables 10 and 12, an electrically conductive element, illustrated in the form of a disk 20 of electrically conductive material, is provided and has an integral ferrule 22 and apertures 24 for receiving the ends of the cables which have been skived to remove a portion of the jacket 16 and expose a given length of conductor 14. Set screws 26 are generally perpendicular to the ferrule 22 and the apertures 24 and are movable to intercept each exposed length of conductor once the length is inserted into its respective ferrule or aperture (as best seen in FIGURE 2) to firmly, but releasably, anchor each conductor in the disk 20, thus establishing a strong detachable mechanical connection as well as an efficient electrical junction among all of the conductors.

To attain the objective of providing a line connector which may safely be employed in locations exposed to the elements as aforesaid, a pair of members, illustrated in the form of a generally annular insert 30 and a generally cylindrical housing 40, are fitted over the cables 10 and 12, respectively, and cooperate with the cable jackets and with one another, in a manner best shown in FIGURE 2, to protectively encase the disk 20 and seal the electrical connections established therein against the action of such elements. The insert and the housing are molded of a resilient material and in order to be fully satisfactory should possess certain additional properties of which the following are important. The material should be non-porous to both gases and liquids and should be substantially impervious to acids and alkalis of the kind and concentrations ordinarily encountered in earth installations. It should be substantially impervious to deterioration from the action of the atmosphere, particularly with reference to sun rays. It should be capable of resisting, without adversely affecting its mechanical and electrical properties, extremes of temperature conditions from subzero temperatures to the high temperatures encountered in above ground installations in tropic or desert locations. It should be relatively firm and non-frangible and must have a certain degree of elasticity. It should be as free as possible from inherent "aging" with time. It should have reasonably good physical properties, particularly the quality of toughness and should have relatively high dielectric strength. Flexible cables suitable for direct ground burial have previously been employed and in the development of such cables, it has been found that in the present state of the materials art, the class of materials which most satisfactorily meets requirements of the nature of those noted above are synthetic polmers of compounds productive of products generically known as "synthetic rubber," of which the following may be mentioned as examples, each of which possesses the aforesaid properties to a greater or lesser extent: "GR–S" (Government rubber, styrene) a polymeric product of butadiene and styrene; "low temperature rubber," also a polymeric product of butadiene and styrene; "neoprene," which is a generic term for a number of chloroprene polymers of different grades and designated as "GR–M" plus numerical designations for the several grades; "butyl rubber," a copolymer of isobutylene and isoprene; and "buna N" ("GR–A," Government rubber, acrylonitrile), a copolymer of butadiene and acrylonitrile. To those skilled in the materials art it will be evident that a substantial variety of materials suitable for the purposes are available. Such other materials may include synthetic resins such as "polythene." Also, while it is possible to mold a member from natural rubber, the use of natural rubber is not to be recommended because of its inherent deterioration with time, or so-called "aging" characteristics. The specific materials employed will therefore be dictated by specific conditions in different cases.

Of the foregoing materials, properly compounded neoprene is highly satisfactory and for purposes of further description herein it will be assumed, without limitation, that neoprene is the material employed.

Referring now in detail to FIGURES 1 and 2, insert 30 is provided with an internal surface 31 having a larger diameter portion 32 and a smaller-diameter portion 33, each portion being located coaxially with ferrule 22 of disk 20. The smaller-diameter portion 33 constitutes a passage for cable 10, the relative normal diameters of the passage and the cable jacket 16 being such that the latter may be passed through the former by hand in what may be characterized as a "snug fit," or a "frictional fit," which will provide what may be called a "water seal" along their corresponding mating surfaces to prevent water from entering the connector through the passage and approaching the electrical connections at disk 20. Such hand insertion of cable 10 is readily acomplished as a result of the interference fit prior to insertion of conductor 14 into ferrule 22 and is facilitated by the provision of chamfer 35 at the entrance to the passage and by the resiliency of the insert material which is expansible to allow a slight dilation of the passage for such insertion while maintaining an effective water seal. The external surface of insert 30 has a larger-diameter portion 36 and a smaller-diameter portion 37, which is in the form of a reverse bevel, with a shoulder 38 therebetween, all for purposes which will be explained hereinafter.

Housing 40 is provided with an internal surface 41 having a series of passages 42 which are located generally coaxially with apertures 24 in disk 20 and which communicate with an internal cylindrical cavity having a larger diameter portion 43 and a smaller diameter portion 44 which is in the form of a reverse bevel ending at end face 45. As in the insert 30, the relative normal diameters of the passages 42 and the cable jackets 16 are such that the latter may be passed through the former by hand in a snug fit outlined above to provide water seals to prevent water from entering the connector through passages 42 and approaching the electrical connections at disk 20. Chamfers 46 and a relief slot 47 (located between the passages 42 as best seen in FIGURES 1 and 3) facilitate the insertion of cables 12 prior to insertion of the conductors 14 into apertures 24, the resilient property of the housing material allowing a slight dilation of passages 42, aided by the presence of the relief slot 47, while maintaining an effective water seal. It is noted that in the embodiment of FIGURES 1 through 3, four passages 42 are illustrated coaxial with four apertures 24 while only two cables 12 are shown for connection to cable 10. The housing 40 and the disk 20 may be fabricated with any desired number of passages 42 and apertures 24, respectively, and where this number is greater than the number of connecting cables 12 found in the field, plugs 48 are supplied to seal the unused passages 42 as shown in FIGURES 2 and 3. In this manner only one type of manufactured housing 40 and disk 20 need be supplied for several different applications where the number of cables 12 may vary. In addition, further cables may be added to, or subtracted from, the junction at any time after the connector is installed. The housing is provided with an external surface 49 for purposes which will be explained shortly.

As best seen in FIGURE 2, the insert 30 and the housing 40 are assembled to protectively encase disk 20 and seal the electrical connections established in the disk within a chamber 50 formed by the cooperation of the larger diameter portions 32 and 43 of surfaces 31 and 41 of the insert 30 and housing 40, respectively, which portions are of a diameter adapted to receive the disk 20 with its ferrule 22 without interference. The relative normal diameters of external surface portion 37 of insert 30 and the corresponding internal surface portion 44 of housing 40 are such that the former may be inserted into the latter by hand, the resilient property of the housing material permitting the housing to be radially expansible thereby allowing a dilation of the internal portion 44 of the housing to admit the external portion 37 of the insert and establish a snug fit between these surfaces, thus providing a water seal along these overlapping portions to prevent water from approaching the electrical connections at the disk 20 along these surfaces. Once the insert 30 and housing 40 are properly assembled, as illustrated in FIGURE 2, with shoulder 38 abutting end face 45, the reverse-bevel configuration of the complementary mating surfaces 37 and 44 acts as a mechanical lock to maintain the insert and housing in such proper assembled relationship. External surfaces 36 and 49 of the insert and the housing, respectively, serve as convenient hand grips for grasping and pushing these members together into assembled relationship. An important feature of the line connector of the invention is that the surfaces 36 and 49 may also serve as hand grips for pulling the insert and housing apart to disassemble these members so that the electrical connections established in the disk 20 may be inspected from time to time during the course of employment of the line connector in a given installation without disturbing the electrical connections. Thus, the line connector of the invention is advantageous not only because of the ease of installation, but for ease of maintenance as well. It is noted that because the cables 10 and 12 are firmly mechanically connected by set screws 26 fixing conductors 14 in disk 20, not only is a positive electrical connection assured despite the application of tensile forces to the cables, but such tensile forces are borne by the disk 20 and not by the insert and housing, thus precluding the possibility of unintentionally opening the seal which is maintained between these assembled members at mating surfaces 37 and 44, by a pull upon the connected cables. However, when the members are intentionally disassembled, the electrical connections may still be disconnected when desired since the mechanical connections between the conductors of the cables are detachable.

In assembling the novel connector to form a junction at the terminus of a group of cables, the respective cables are first passed through the passages provided therefor in the insert and the housing and pulled to a position shown in FIGURE 1. Plugs are inserted into those passages which may not be employed for cables. The cables are skived and the respective exposed conductors are inserted into the ferrule and the apertures of the disk and fixed therein by rotating the set-screws to clamp the conductors in place. The insert and the housing are then drawn along the cables which pass through each member, respectively, toward one another until the former is inserted into the latter to complete the assembly illustrated in FIGURE 2, the disk thus being protectively encased in the chamber. Both the passsing of the cables through the passages and the insertion of the insert into the housing may be facilitated by the use of a lubricant, helping to assure that the installation procedure may readily be carried out in the field in a rapid and efficient manner. Disassembly of the entire connector is accomplished readily by merely reversing the above procedure.

Figure 4:
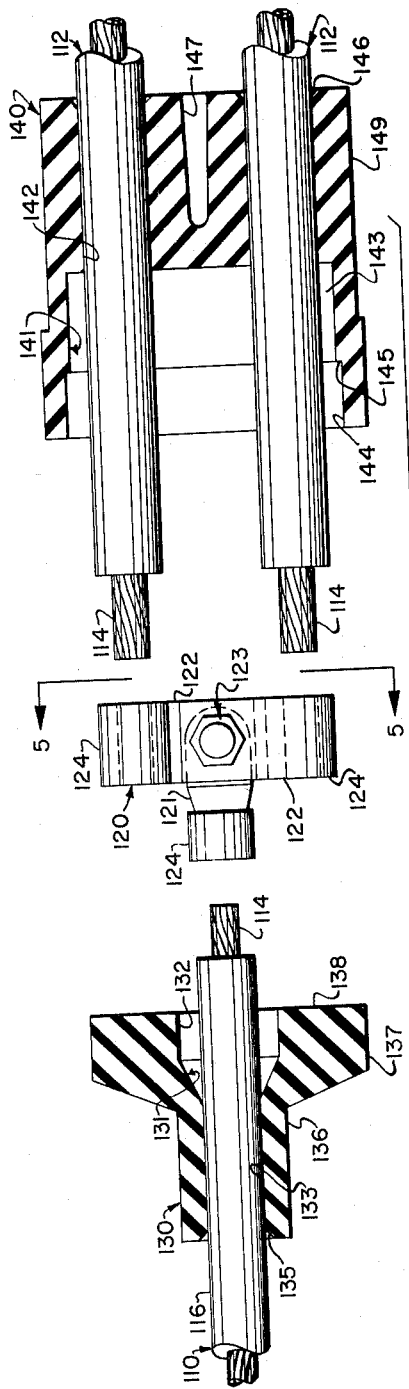
FIGURE 4 is an exploded sectional view illustrating the component parts of another embodiment of the invention.
Figure 6:
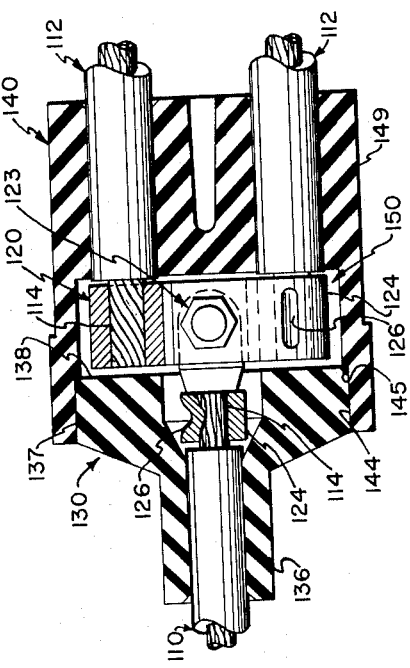
FIGURE 6 is a sectional view illustrating the embodiment of FIGURE 4 with the component parts in assembled relationship.
Figure 5:
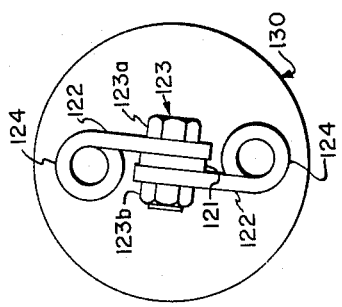
FIGURE 5 is an end elevational view taken along line 5—5 of FIGURE 4.

Referring now to FIGURES 4 through 7, another embodiment of the invention is shown in a variety of views illustrating novel features thereof. In FIGURE 4, the component parts of the connector are shown prior to assembly at the terminus of cables 110 and 112 where a junction will be formed in a manner similar to the junction described in the embodiment of FIGURES 1 through 3. However, the mechanical connection and the electrical junction of the conductors 114 is accomplished through the employed of an assembled electrically conductive element 120 comprised of electrical contacts illustrated in the form of a tongue terminal lug 121 and a pair of flag terminal lugs 122, all joined together mechanically and electrically by a fastener 123 illustrated in the form of a bolt 123a and nut 123b (see FIGURE 5), each lug having a ferrule 124 integral therewith for receiving its respective conductor, as best seen in FIGURE 6. In joining the conductors, each lug 121 and 122 may be conveniently individually slipped over its respective conductor prior to the assembly of the lugs with the fastener 123 and fixed thereto in a conventional manner, as by forming a crimp 126 (see FIGURE 6) in each ferrule 124, the lugs being assembled subsequent to the crimping operation. Such a configuration has been found to enhance the simplicity of the manufactured components and the installation procedure while providing a relatively strong, yet easily detachable mechanical connection as well as an effective electrical junction.

As in the embodiment of FIGURES 1 through 3 described above, insert 130 and housing 140 are molded of a resilient insulating material and cooperate with cables 110 and 112 and with one another to protectively encase element 120 and seal the electrical connections established in the assembled element as follows:

Insert 130 is generally annular in form and is provided with an internal surface 131 having a larger diameter portion 132 and a smaller diameter portion 133, which constitutes a passage for receiving cable 110 prior to the attachment of tongue terminal lugs 121 to the conductor 114, the insertion of the cable into the passage being facilitated by chamber 135 and the resilient nature of the insert material forming a water seal between the mating surfaces of the cable jacket 116 and the passage. The external surface of the insert has a smaller diameter portion 136 and a larger diameter portion 137 ending at front face 138 for purposes which will be explained hereinafter.

The housing 140 is provided with an internal surface 141 having a pair of passages 142 which communicate with a cavity 143 having a configuration adapted to receive the assembled element 120 without interference, as best seen in FIGURE 6, and a cylindrical internal surface portion 144 with a shoulder 145 therebetween. As in the insert 130, the passages 142 receive cables 112 prior to the attachment of flag terminal lugs 122, the chambers 146 and the relief slot 147 (see also FIGURE 7) serving to ease the insertion of the cables into the passages, the resiliency of the housing material establishing water seals therebetween. The housing is provided with an external surface 149 for purposes which will be explained shortly.

Subsequent to the attachment of the lugs 121 and 122 to their respective conductors 114 and the assembly of the lugs 121 and 122 by the fastener 123, insert 130 and housing 140 are brought together to form the completed assembly illustrated in FIGURE 6, the former being inserted into the latter until front face 138 abuts shoulder 145, the relative normal diameters of the corresponding external surface portion 137 and internal surface portion 144 being such that snug fit is attained at these mating surfaces which not only provides a water seal to protectively encase the assembled element 120 and the electrical connections formed in the element within the chamber 150, but mechanically locks insert 130 in place within the housing 140. External surfaces 136 and 149 of the insert 130 and the housing 140, respectively, provide convenient hand grips for readily accomplishing the above assembly in the field. By reversing the above procedure, the insert is conveniently removed from the housing for periodic inspection of the mechanical and electrical connections in element 120.

Figure 8:
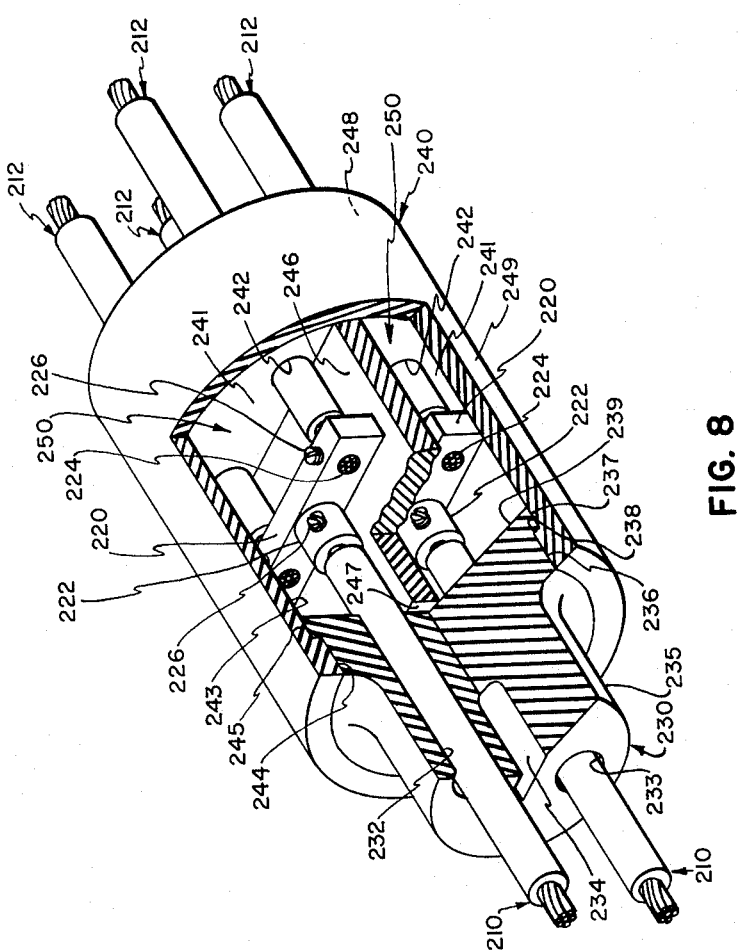
FIGURE 8 is a partially sectioned perspective view of another embodiment of the invention.

Another embodiment of the invention is illustrated in FIGURE 8 in assembled form and may be described rather briefly since the principles employed therein have been explained in detail above. Here, each of a pair of cables 210 is joined mechanically and electrically to both of a pair of cables 212, by an electrically conductive bar 220, the conductors of cables 210 and 212 being placed in the ferrules 222 and apertures 224, respectively, of each bar 220 and releasably anchored therein by the set screws 226.

The insert 230, molded of a resilient insulating material, is provided with a pair of passages 232 corresponding to the cables 210, the jackets of the cables cooperating with the passages 232 to provide water seals along these mating surfaces. The chamfers 233 and the relief slot 234 facilitate the insertion of cables 210 into passages 232 as explained above. The insert 230 is provided with external surface portions 235, 236 and 237 with a shoulder 238 between portions 236 and 237 and a front face 239, all for purposes which will be explained hereinafter.

Cooperating with insert 230 to protectively encase the bars 220 and seal the electrical connections established in the bars is the housing 240 which is molded of a resilient insulating material and is provided with four passages 242 communicating with a cavity 241 and cooperating with the jackets of cables 212 in such a way as to form water seals to prevent water from approaching the cavity 241 through passages 242 when cables 212 are inserted therein, the cavity 241 having a larger diameter cylindrical surface portion 243 and a smaller diameter portion 244 with a shoulder 245 therebetween, the larger diameter portion of the cavity being divided by a separator web 246 ending in an abutment face 247, all for purposes which will be explained shortly. Though not shown in the view chosen for the illustration in FIGURE 8, chamfers may be provided at the entrance to the passages 242 and a relief slot may be provided in right end face 248 similar to corresponding features shown in FIGURE 3, for facilitating the insertion of cables 212 into passages 242 in a manner described in conjunction with the configuration of FIGURE 3. An external surface 249 is provided for purposes which will be explained shortly.

As in the previously described assembly procedures, the cables are passed through their respective passages in the insert and the housing and the conductors are fixed within the bars 220. Both the insert and the housing are drawn along the cable jackets toward one another until the internal portions 243 and 244 of the housing overlap with external surface portions 237 and 236 of the insert, respectively, and front face 239 abuts the face 247 of web 246 as shown in FIGURE 8. The relative normal diameters of internal portion 243 of the housing and external portion 237 of the insert are such that an interference fit is established by virtue of the resilient nature of the materials employed and a water seal is formed therebetween to prevent water from approaching the electrical connections established in bars 220 along these mating surfaces when the insert is properly seated within the housing. Abutting shoulders 238 and 245 and abutting faces 239 and 247 constitute positive mechanical locks serving to maintain the insert in position within the housing. In this respect it is noted that the relative normal diameters of external surface portion 236 of the insert and internal surface portion 244 of the housing are such that there is no dilation of portion 244 of cavity 241 in the completed assembly so that the full shoulder 245 is presented to shoulder 238 and maximum holding power is assured. Separator web 246 serves to electrically isolate each bar 220, and the electrical connections established therein, from the other bar, each bar lying within a sealed chamber 250. Assembly and disassembly of the insert and housing is facilitated in the field by the convenient hand grips provided in external surfaces 235 and 249, respectively, for allowing the insert and the housing to be firmly gripped and pushed together or pulled apart.

It is to be understood that the above detailed description of preferred embodiments of the invention is provided by way of example only and is not intended to restrict the invention. Various details of design and construction may be modified without departing from the true spirit and scope of the invention as defined in the appended claims.

We claim:
1. An electrical connector assembly for providing a detachable, waterproof, insulated electrical junction between a plurality of first cables and at least one second cable, each cable having an electrical conductor and a jacket of insulating material, said connector assembly comprising:
(A) a first member of resilient insulating material, said first member having a plurality of independent portions gripping the cable jackets of said plurality of first cables such that said first member is movable along said first cables relative to the cable jackets thereof and is in watertight relation therewith;
(B) a second member of resilient insulating material, said second member having at least one portion gripping the cable jacket of said second cable such that said second member is movable along said second cable relative to the cable jacket thereof and is in watertight relation therewith;
(C) means detachably securing and electrically connecting said conductors to one another independent of the position of said first and second members along the cables and mechanically securing the cables to one another against detachment during said relative movement of said first and second members; and
(D) said members each having further portions separably gripping one another in detachable watertight relation to form a waterproof chamber within which chamber said means are encased to protectively seal the electrical connections established among said conductors, said further portions being disengagable from one another by movement of said first and second members relative to one another and relative to said cables to thereby open said chamber and expose said connections without disconnecting said connections.

2. An electrical junction capable of being assembled and disassembled in the field for providing a detachable, waterproof, insulated electrical junction between a plurality of first cables and at least one second cable, each cable having an electrical conductor and a jacket of insulating material, said junction comprising:
(A) a first member of resilient insulating material, said first member having a plurality of independent portions for cooperating with corresponding portions of the cable jackets of said plurality of first cables in a snug fit therewith such that said first member will be movable along said first cables relative to the cable jackets thereof and will be in watertight relation therewith;
(B) a second member of resilient insulating material, said second member having at least one portion for cooperating with a corresponding portion of the cable jacket of said second cable in a snug fit therewith such that said second member will be movable along said second cable relative to the cable jacket thereof and will be in watertight relation therewith;
(C) means for detachably securing said conductors to one another and forming an electrical junction among said conductors independent of the position of said first and second members along the cables and mechanically securing the cables to one another against detachment during said relative movement of said first and second members; and
(D) said first and second members having further corresponding portions for separably cooperating with one another in a snug fit which will establish a water seal to form a watertight chamber for containing said means such that said electrical junction will be protectively sealed within said chamber upon assembly of said members and said junction may readily be exposed upon disassembly of said members without disconnecting said electrical junction.

3. An electrical junction having component parts capable of being assembled and disassembled in the field for providing a detachable, waterproof, insulated electrical junction between a plurality of first cables and at least one second cable, each cable having an electrical conductor and a jacket of insulating material, said junction comprising:
(A) a first member of resilient insulating material having a plurality of independent resiliently dilatable passages gripping the cable jackets of said plurality of first cables such that said first member is movable along said first cables relative to the cable jackets thereof and is in watertight relation therewith;
(B) a second member of resilient insulating material having at least one resiliently dilatable passage gripping the cable jacket of said second cable such that said second member is movable along said second cable relative to the cable jacket thereof and is in watertight relation therewith;

(C) a cavity within said first member in open communication with the passages in said first member and having a resiliently dilatable portion;

(D) means detachably securing said conductors to one another and forming an electrical junction among said conductors independent of the position of said first and second members along the cables and mechanically securing the cables to one another against detachment during said relative movement of said first and second members, said means being positioned within said cavity; and (E) said second member having a portion separably cooperating with said resiliently dilatable portion of said cavity in watertight relation to form a waterproof chamber within said assembled members for encasing said means such that said electrical junction is protectively sealed within said chamber and is capable of being exposed upon opening said chamber by disassembly of said members without disconnecting said electrical junction.

4. An electrical junction having component parts capable of being assembled and disassembled in the field for providing a detachable, waterproof, insulated electrical junction between a plurality of first cables and at least one second cable, each cable having an electrical conductor and a jacket of insulating material, said connector comprising:

(A) a housing of resilient insulating material having a resiliently dilatable internal surface, a first portion of said internal surface having a plurality of independent passages each removably receiving a corresponding portion of the jacket of one of said first cables in a snug fit therewith such that said housing is movable along the first cables relative to the cable jackets thereof and said first portion provides a water seal therebetween;

(B) an insert of resilient insulating material having an external surface and a resiliently dilatable internal surface, a first portion of said internal surface removably receiving a corresponding portion of the jacket of a second cable in a snug fit therewith such that said insert is movable along the second cable relative to the cable jacket thereof and said first portion provides a water seal therebetween;

(C) the internal surfaces of said housing and said insert each having a second portion cooperating with one another to form a chamber;

(D) a connector element detachably securing and electrically connecting said conductors to one another and forming an electrical junction among said conductors independent of the position of said housing and said insert along the cables and mechanically securing the cables to one another against detachment during said relative movement of said housing and said insert, said connector element being positioned within said chamber; and (E) a further portion of the internal surface of said housing separably overlapping a corresponding portion of the external surface of said insert in a snug fit therewith providing a water seal to seal said chamber and protectively encase said connector element and the electrical junction established therein within said chamber, said further portion and corresponding portion being disengagable from one another by movement of said housing and said insert relative to one another and relative to said cables to thereby open said chamber and expose said connector element without disconnecting said electrical junction.

5. An electrical connector of claim 4 wherein said connector element comprises:

(A) an electrical contact mechanically secured and electrically connected to each said conductor; and (B) means detachably securing and electrically connecting said contacts to one another independent of the relative position of said housing and said insert.

6. A connector kit for detachably connecting a plurality of first cables and at least one second cable to provide a waterproof, insulated electrical junction in the field, each cable having an electrical conductor and a jacket of insulating material, said kit comprising:

(A) a housing of resilient insulating material having
   (1) a cavity in open communication with an end of said housing and including a resiliently dilatable internal cylindrical surface adjacent said end, and
   (2) a plurality of independent passages in open communication with another end of said housing and with said cavity, said passages being resiliently dilatable so as to grip the jackets of said first cables such that said housing is movable along the cables relative to the cable jackets and is in watertight relation therewith;

(B) an insert of resilient insulating material having an external cylindrical surface and at least one passage in open communication with the ends of said insert, said passage being resiliently dilatable so as to grip the jacket of a second cable such that said insert is movable along the cable relative to the cable jacket and is in watertight relation therewith;

(C) an electrically conductive connector element capable of detachably securing and electrically connecting said conductors independent of the position of said housing and said insert along the cables and mechanically securing the cables to one another against detachment during said relative movement of said housing and said insert and thereafter being positioned in said cavity; and (D) the relative diameters of said internal and external cylindrical surfaces being such that said insert may be separably assembled with said housing with said surfaces overlapping in watertight relation to seal said cavity and form a waterproof chamber within which chamber said connector element and the electrical junction established therein will be protectively encased, said cylindrical surfaces being disengagable from one another by movement of said housing and said insert relative to one another and relative to said cables to thereby open said chamber and expose said connector element without disconnecting said electrical junction.

7. A connector kit of claim 6 wherein said connector element comprises:

(A) electrical contacts, each said contact capable of being mechanically secured and electrically connected to one of said conductors; and (B) means for detachably securing and electrically connecting said contacts to one another independent of the relative position of said housing and said insert.

References Cited by the Examiner

UNITED STATES PATENTS

| 2,710,385 | 6/1955 | Sprigg | 339—61 |
| 2,782,391 | 2/1957 | Kirk | 339—60 X |
| 2,984,811 | 5/1961 | Hennessey et al. | 339—94 X |
| 3,047,835 | 7/1962 | Kelly | 339—242 |
| 3,120,987 | 2/1964 | Degnan et al. | 339—94 X |
| 3,167,374 | 1/1965 | Healy | 339—60 |

FOREIGN PATENTS 603,975  6/1948  Great Britain.

PATRICK A. CLIFFORD, *Primary Examiner.*

A. S. TRASK, *Assistant Examiner.*